United States Patent
Howlett, Jr. et al.

[19]

[11] Patent Number: 6,095,732
[45] Date of Patent: *Aug. 1, 2000

[54] BAG-IN-BAG COMBINATION DUNNAGE AIRBAG HAVING REDUCED NUMBER OF PAPER PLIES

[75] Inventors: John Howlett, Jr., Little Rock, Ark.; Hugh J. Zentmyer, Green Oaks, Ill.

[73] Assignee: Illinois Tool Works Inc., Glenview, Ill.

[ * ] Notice: This patent is subject to a terminal disclaimer.

[21] Appl. No.: 09/131,012

[22] Filed: Aug. 7, 1998

Related U.S. Application Data

[63] Continuation of application No. 08/654,307, May 28, 1996, Pat. No. 5,788,438.

[51] Int. Cl.$^7$ ...................................................... B60P 7/16
[52] U.S. Cl. ............................................ 410/119; 410/125
[58] Field of Search .................................... 410/117, 118, 410/119, 122, 125, 155; 206/522; 428/35.2; 383/25, 109, 113

[56] References Cited

U.S. PATENT DOCUMENTS

| | | |
|---|---|---|
| 3,199,689 | 8/1965 | Feldkamp ................................ 410/119 |
| 3,204,825 | 9/1965 | Underwood . | 
| 3,556,318 | 1/1971 | Hollis . |
| 3,868,026 | 2/1975 | Baxter . |
| 3,955,690 | 5/1976 | Baxter . |
| 4,040,526 | 8/1977 | Baxter et al. . |
| 4,136,788 | 1/1979 | Robbins . |
| 4,591,519 | 5/1986 | Liebel . |
| 4,872,558 | 10/1989 | Pharo ...................................... 206/522 |
| 5,134,001 | 7/1992 | Osgood . |
| 5,288,188 | 2/1994 | Vance ...................................... 410/119 |
| 5,788,438 | 8/1998 | Goshorn et al. ......................... 410/119 |
| 5,868,534 | 2/1999 | Goshorn et al. ......................... 410/119 |
| 5,908,275 | 6/1999 | Howlett, Jr. et al. .................... 410/119 |

*Primary Examiner*—Stephen T. Gordon
*Attorney, Agent, or Firm*—Schwartz & Weinrieb

[57] ABSTRACT

An inflatable dunnage bag comprises a first inflatable inner bag comprising an inflatable bladder surrounded by at least one paper ply, and a second outer bag comprising at least one paper ply, or two or more paper plies whereby the number of paper plies comprising the entire composite inflatable dunnage bag, that is, the number of paper plies comprising the inner bag and the number of paper plies comprising the outer bag, is an odd number of paper plies. Consequently, the number of paper plies required to fabricate an inflatable dunnage bag, while maintaining the structural integrity and burst strength characteristics thereof for predetermined load applications, is effectively reduced with respect to currently manufactured dunnage bags.

15 Claims, 6 Drawing Sheets

BAG-IN-BAG COMBINATION DUNNAGE AIRBAG HAVING REDUCED NUMBER OF PAPER PLIES

CROSS-REFERENCE TO RELATED PATENT APPLICATION

This patent application is a Continuing Patent Application with respect to U.S. patent application Ser. No. 08/654,307, filed on May 28, 1996, and entitled INFLATABLE COMBINATION CARGO PACKING BAG, now U.S. Pat. No. 5,788,438.

FIELD OF THE INVENTION

The present invention relates generally to dunnage bags for use in connection with the shipment of freight or cargo by means of truck, rail, aircraft, ship, and the like, and more particularly to an improved combination dunnage bag which comprises an inflatable inner bag, and an outer paper bag which may comprise one or more paper plies, wherein the particular structure of the combination bag exhibits improved burst strength characteristics whereby predetermined burst strength values or characteristics are able to be achieved with a fewer number of paper plies than has been heretofore conventionally possible or achieved.

BACKGROUND OF THE INVENTION

Inflatable, disposable dunnage bags comprise a relatively inexpensive and easily useable means of stabilizing cargo or freight disposed within cargo holds, containers, box-cars, or trailers of aircraft, trucks, trains, ships, and the like, so as to effectively prevent damage to such goods which would be likely to occur if the goods were not otherwise secured or tied down within the cargo hold or the like since the goods would be subjected to shifting movements within the cargo hold in response to movements of the particular transportation vehicle during shipping or transport. As is well known and conventionally practiced, inflatable dunnage bags are placed between individual, adjacent cargo items or pieces, or between the individual cargo pieces and the side walls of the vehicle which define the cargo hold, in an initially deflated condition and are then subsequently inflated with, for example, compressed air to a predetermined pressure value which is of course below the bursting pressure limit of the bag. Most bags which are conventionally used are specifically constructed so as to withstand bursting pressure values which are within the range of 12–30 psig.

Such conventional inflatable dunnage bags typically comprise a sealed inner plastic bladder or bag, which is fabricated, for example, from polyethylene, and an outer multiwalled or multi-layered paper bag that serves to protect the inner inflatable bag or bladder as well as to increase the bursting strength thereof. A valve is provided upon the inflatable bladder and extends through the outermost paper layer of the multi-layered paper bag so that the dunnage bag can be inflated and expanded when desired, that is, for example, for cargo securing purposes, with compressed air from an external compressed air source.

Manufacture of such conventional inflatable dunnage bags typically comprises folding a predetermined length of multi-layered kraft paper onto itself and about a longitudinal axis thereof such that the edges thereof can form an overlapping longitudinal seam which extends along the centerline of the bag, the result being a multi-walled paper tube having opposite open ends. The sealed plastic bladder is then inserted into the paper tube, and the tube ends are then folded over onto themselves so as to be subsequently glued or sewn closed thereby forming the completed dunnage bag.

It is thus appreciated that the fabrication of conventional dunnage bags as set forth hereinbefore presents several manufacturing problems. There is initially the problem of being capable of cutting a large number of paper plies during a single cutting operation. In addition, the manufacture of the bag is dependent upon or limited by the ability to stitch together the multiple layers of paper comprising the outer paper bag, as well as the capability of effectively folding and gluing the folded ends of the bag to the body portion of the bag such that the folded glued bonds do not subsequently fail or come undone. The construction of such multi-layered bags is also relatively labor intensive such that the greater the number of paper plies or layers, the greater the labor costs involved in fabricating the particular bag. Consequently, while it is desirable to attain an inflatable dunnage bag which exhibits a higher capacity to resist loading, or in other words, exhibits greater bursting pressure values as a result of being fabricated as a multi-layered structure, the cost of such a bag is higher than conventional bags with fewer layers of paper.

Consequently, in view of the foregoing, it was the object of the aforenoted related patent application, Ser. No. 08/654, 307, filed on May 28, 1996, and entitled INFLATABLE COMBINATION CARGO PACKING BAG, to provide an improved inflatable dunnage bag which in fact exhibited higher bursting strength or pressure values and which was easier to manufacture in view of the fact that it was no longer necessary to sew or stitch together all of the paper plies or layers comprising the multi-layered paper tube of the dunnage bag, and in addition, the number of paper plies or layers which had to be glued together was also reduced. In accordance with that invention, the improved inflatable dunnage bag comprised a "bag within a bag" wherein a first inner bag, comprising an inflatable polyethylene bladder disposed within a two-ply paper bag, is subsequently inserted or encased within a second outer bag which may comprise two, four, or six paper plies. Consequently, while the same number of paper plies, for example, still comprise the completed dunnage bag, only those paper plies comprising the first inner bag need to be stitched or sewn, and the number of paper plies which need to be folded and glued in order to complete the manufacture of the dunnage bag, that is, those plies comprising the second outer bag, has been effectively reduced.

More particularly, with reference being made to FIG. 1 of the drawings, the inner or first inflatable bag is illustrated and generally indicated by the reference character 30. The bag 30 comprises a first end 32 and a second opposite end 34, and as can be appreciated from FIG. 2, with only first end 32 being shown, each end 32 and 34 is enclosed by means of a binding material 15 prior to the ends 32 and 34, and the binding material 15, being sewn together so as to close and seal the ends 32 and 34 of the bag 30. The longitudinal or lengthwise seam 36 of the bag 30 is formed by overlapping the longitudinal edge portions 37 and 39 of the bag 30, and once the seam 36 is formed and the ends 32 and 34 are closed and sealed, the inner bag 30 defines a closed and sealed interior which is able to be inflated by means of a suitable compressed gas, such as, for example, air.

As shown in FIG. 2, the inner or first inflatable bag 30 further comprises a thermoplastic bladder 10 which is fabricated as a continuous polyethylene tube that only requires heat sealing of its two opposite ends. The bladder 10 is initially disposed in a flattened state and is seen to comprise a first upper wall 10A and a second lower wall 10B which are sealed together at the opposite ends so as to form a sealed joint 12. The joint 12 is formed somewhat inwardly from the edge portion of the bladder 10 so as to form or define an end flap portion 13A. Paper plies 1 and 2 envelop the bladder 10, and in accordance with a first mode of constructing the composite bag 30, the first paper ply 1 is disposed atop the second paper ply 2, and the paper plies 1 and 2 are then folded in half so that each paper ply 1 and 2 has a first end 1C,2C and a second end 1D,2D in registry with each other, wherein the bladder 10 is disposed interiorly of, and enveloped by, the paper plies 1 and 2. in order to seal each end 32 and 34 of the composite inner bag 30, a binding 15 is disposed about the end 32, as illustrated, of the bag 30 so as to cover the paper plies 1 and 2, and the flap portion 13A of the bladder 10, and subsequently, suitable stitching 17 penetrates the composite end 32 of the bag 30 as defined by paper plies 1 and 2, bladder flap portion 13A, and binding 15. A similar technique is of course implemented with respect to inner bag end 34. In lieu of folding paper plies 1 and 2 in half, separate upper and lower paper plies 1 and 2 may be simply disposed atop each other such that the four separate and discrete paper plies 1 and 2 are simply secured and sealed together without any folding of the the paper plies being required.

In order to inflate the interior portion of the composite inner bag 30 with a suitable compressed gas, such as, for example, air, an inflation valve 20 is heat sealed within the upper wall 10A of the bladder 10 and projects outwardly through respective holes 25a, 25b, and 25c that are respectively provided within upper walls 2A, 1A, and 10A of the paper plies 2 and 1, and the bladder 10. While the composite inner bag 30 exhibits an average burst strength of approximately 8.0 psig, which is certainly adequate for light-duty or lightcargo applications, the composite inner bag 30 is adapted or intended to be disposed within a second outer bag comprising a tube fabricated from additional paper plies, for example, two, four, or six additional plies, whereupon insertion of the first inner bag 30 within the second outer paper bag, the ends of the second outer paper bag are then closed and sealed. Such an arrangement, comprising in effect a "bag within a bag", exhibits higher bursting strength or pressure values.

With reference therefore being made to FIG. 4, one end of the composite "bag within a bag" is disclosed, and it is to be understood that the other end of such composite bag comprises substantially identical structure. More particularly, it is seen that the first inner composite bag 30 of FIG. 2 has been inserted between two additional paper plies 3 and 4 whereby the completed or assembled composite bag 40 comprises a total of four paper plies, two of which initially comprise the first inner composite bag 30 and the other two comprising the outer composite bag 35. The paper plies 3 and 4 have respective first and second ends 3A,4A, and 3B,4B, with the second end 3B being folded and secured to the first end 3A by means of a glue bead 80, while the second end 4B is similarly folded and secured to the second end 3B by means of a glue bead 82. In order to complete the assembly of the composite bag 40, the outer surface 4C of paper ply 4 is coated with a suitable heat-sealable plastic, such as, for example, polyethylene 100, whereby through means of known heat-sealing techniques, second end 4B can be heat-sealed to first end 4A.

With comparison being made between the completed or assembled composite bag 40, comprising the first inner composite bag 30 and the second outer composite bag 35, and a conventional or prior art four-ply bag as shown in FIG. 3, it is readily appreciated that although the same number of glue beads are required for fabrication of the completed or assembled composite bag, the four-ply composite bag 40 shown in FIG. 4 is easier to fabricate than the conventional or prior art bag shown in FIG. 3 due to the reduced number of paper plies that are required to be simultaneously cut, folded, and glued together since the first inner composite bag 30 of the completed or assembled bag 40 of FIG. 4 is separately fabricated. In addition, having a reduced number of simultaneously folded plies reduces the tendency of the folded ends of the completed or assembled bag to unfold or fail. Still further, the bursting strength of the completed or assembled composite bag 40 is greater than that of the conventional or prior art bag shown in FIG. 3. It is lastly noted that while the first inner composite bag 30 is disposed interiorly or within the second outer composite bag 35, and wherein the inflation valve 20 of bag 30, as disclosed in FIG. 2, is not actually shown or illustrated in the completed or assembled composite bag 40 of FIG. 4, it is to be understood that the valve 20 does project outwardly through suitable holes, not shown, provided within paper plies 3 and 4 so as to be externally accessible in order to inflate the bladder of inner composite bag 30 with compressed gas from a suitable source of compressed gas, also not shown.

With reference now being made to FIG. 5, a further embodiment of the invention as disclosed within the aforenoted related patent application is illustrated, and it is seen that in accordance with this embodiment, the completed or assembled composite bag 40 comprises a total of six paper plies wherein two of such paper plies comprise or form a part of the first inner composite bag 30, including the inflatable bladder 10, and the remaining four paper plies comprise the second outer composite bag 35. The four paper plies 3–6 each have respective first and second ends 3A–6A and 3B–6B which are uniquely folded so as to reduce the number of folded ply ends and the number of glue beads needed to secure the ply ends, as compared to, for example, a conventional six-ply bag as shown in FIG. 7. More particularly, it is seen that in accordance with the invention embodiment of FIG. 5, the ends 6A and 6B. are heat-sealed together, while ends 5B, 4B, and 5A are glued together by glue beads 50. End 3B is folded so as to be interposed between first inner composite bag 30 and end 3A, while end 4A is freely interposed between ends 3A and 5A. Comparing this structure to that of FIG. 7, it is seen that all six paper plies 1–6 are all simultaneously folded back upon themselves as a collective group before the various ends are glued and heat-sealed together. As noted hereinbefore, the greater the number of paper plies to be folded, the more burdensome it becomes to in fact achieve such folding of the paper ply ends, to bind such folded plies with the glue, and to maintain the folded and glued plies in such folded and glued state due to the inherent tendency of the folded ends to unfold and separate from each other.

An eight-ply composite bag 40, constructed in a similar manner in accordance with the principles of the invention of the previously noted related patent application, is illustrated in FIG. 6 and is again seen to comprise the first inner composite bag 30, which includes the first two paper plies and the inflatable bladder, while the second outer composite bag 35 comprises paper plies 3–8. The paper plies 3–8 have respective first and second ends 3A–8A and 3B–8B which are also uniquely folded, glued, and heat-sealed so as to effectively reduce the number of plies needed to be glued and heat-sealed as compared to a conventional eight-ply dunnage bag as illustrated in FIG. 8. In order to glue and seal the conventional bag of FIG. 8, seven glue beads and one heat-seal are required, whereas in connection with the inventive bag of FIG. 6, only three glue beads and one heat-seal are required. More particularly, ends 7A and 7B are glued together by glue bead 60, while end 5B is glued to end 4B. and end 4B is glue to end 5A by glue beads 70. Ends 8A and 8B are heat-sealed together, while ends 6A and 6B are freely interposed between ends 7A and 5B, and ends 4A, 3B, and 3A are freely interposed between end 5A and first inner composite bag 30.

In light of the foregoing, it is therefore appreciated that the composite "bag within a bag" 40 of the aforenoted, previously filed patent application has certainly resolved some of the manufacturing problems or deficiencies characteristic of conventional dunnage bags, and has concomitantly achieved its initial objectives of enhancing the bursting strength or burst pressure values of the bags while maintaining the same number of paper plies comprising the bag. The reliability or structural integrity of the bag has of course been maintained while manufacture of the bag has been simplified by reducing the number of paper ply folds which need to be simultaneously handled, folded, glued, and heat-sealed. It has been realized, however, that dunnage bags of the aforenoted types, which have been disclosed within the particularly noted drawings and described hereinbefore, can be simplified still further without adversely affecting, for example, burst strength characteristics or values with respect to particularly desired load applications or requirements, and still further, that such dunnage bags can be rendered more cost-effective from a manufacturing or production point of view.

A need therefore exists in the art for multi-ply or multi-layered dunnage bags which can be simply manufactured, which exhibit predeterminedly adequate bursting strength or pressure values for predetermined load applications, which exhibit or provide ensured reliability and structural integrity, and which can be manufactured in a cost-effective manner by decreasing the cost per unit bag produced as a result of a reduction in connection with the materials required to produce such bags, that is, by reducing the number of paper plies required in connection with the fabrication of a particular dunnage bag which is adapted to be used in connection with a particular load application.

OBJECTS OF THE INVENTION

Accordingly, it is an object of the present invention to provide a new and improved inflatable cargo dunnage bag of the composite type comprising an inner bag and an outer bag.

Another object of the present invention is to provide a new and improved inflatable composite dunnage bag which permits the bags to be manufactured in a cost-effective manner by permitting the number of paper plies of the composite bag, and in particular, with respect to or respectively comprising both the inner bag and the outer bag, to be reduced.

A further object of the present invention is to provide a new and improved inflatable composite dunnage bag which despite the aforenoted achieved reduction in the number of paper plies comprising the composite bag, and in particular, respectively comprising the inner and outer bags, nevertheless exhibits predeterminedly adequate burst strength pressure values or characteristics, which is relatively simple to fabricate or construct, and which exhibits the required structural integrity and reliability.

SUMMARY OF THE INVENTION

The foregoing and other objectives are achieved in accordance with the teachings and principles of the present invention through the provision of an inflatable dunnage bag which comprises a first inner composite bag comprising an inflatable bladder enveloped or encased within one or more paper plies disposed upon opposite sides thereof, and a second outer composite bag similarly comprising one or more paper plies disposed upon opposite sides of the first inner composite bag, In accordance with, for example, a first embodiment of the present invention, the first inner composite bag comprises the inflatable bladder enveloped or encased within only a single paper ply, and the second outer composite bag similarly comprises only a single paper ply. In accordance with a second embodiment of the present invention, the first inner composite bag similarly comprises the inflatable bladder enveloped or encased within the single paper ply, but the second outer composite bag comprises a pair of paper plies. These two embodiments of the present invention are similar to or substantially the equivalent of the embodiment previously disclosed within FIG. 4 of the present application drawings and as disclosed within the previously filed patent application whereby the bags comprising these first and second embodiments of the present invention can be utilized for applications which require similar, relatively low burst strength values or characteristics in connection with which the bag of FIG. 4 was heretofore used. It is to be appreciated, however, that the number of paper plies comprising the entire composite dunnage bag of the first embodiment is two, while the number of paper plies comprising the entire composite dunnage bag of the second embodiment is three whereby the number of paper plies comprising the entire composite dunnage bag has been significantly reduced which of course leads to a significant reduction in manufacturing costs.

In accordance with a third embodiment of the present invention, the first inner composite bag comprises the inflatable bladder enveloped or encased within a pair of paper plies while the second outer composite bag comprises three paper plies. This dunnage bag embodiment is essentially equivalent to the dunnage bag embodiment previously disclosed within FIG. 5, however, again the number of paper plies comprising the entire composite dunnage bag has been reduced from six to five whereby, again, the number of paper plies required to fabricate the dunnage bag has been significantly reduced both upon a percentage basis and upon a real-cost basis. That is, considering such from a percentage basis, the number of paper plies has been reduced one-sixth or approximately sixteen per cent (16%), and considering such from a real-cost basis, the price of each composite dunnage bag has been reduced by means of the cost of one paper ply when this cost is multiplied by several hundred thousand or several million, that is, by the number of dunnage bags produced annually, the real-cost savings is substantial and quite apparent.

Lastly, in accordance with a fourth embodiment of the present invention, the first inner composite bag comprises the inflatable bladder enveloped or encased within a pair of paper plies as was the case with the third embodiment of the invention, however, the second outer composite bag comprises five paper plies. The dunnage bag of this embodiment is therefore seen to be essentially equivalent to the dunnage bag embodiment previously disclosed within FIG. 6, however, the number of paper plies comprising the entire composite dunnage bag has been reduced from eight to seven with a consequent savings in manufacturing costs.

BRIEF DESCRIPTION OF THE DRAWINGS

Various other objects, features, and attendant advantages of the present invention will be more fully appreciated from the following detailed description, when considered in connection with the accompanying drawings in which like reference characters designate like or corresponding parts throughout the several views, and wherein.

DETAILED DESCRIPTION OF THE PREFERRED EMBODIMENT

Figure 9:
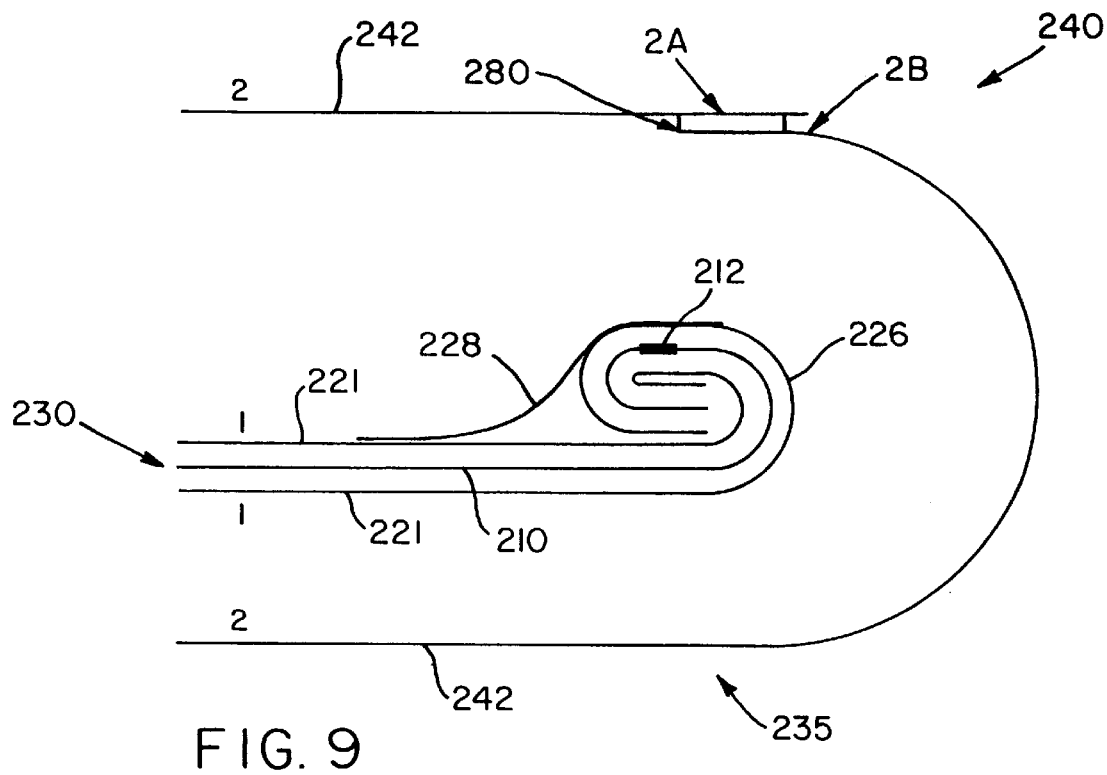
FIG. 9 is a view similar to that of FIG. 4 showing, however, a first embodiment of a new and improved two-ply composite dunnage bag constructed in accordance with the principles and teachings of the present invention.

Referring again to the drawings, and more particularly to FIG. 9 thereof, a first embodiment of the new and improved composite inflatable dunnage bag, constructed in accordance with the principles and teachings of the present invention, is illustrated and generally indicated by the reference character 240. The composite inflatable dunnage bag 240 is broadly similar to the composite inflatable dunnage bag 40 of FIGS. 4–6, however, as noted hereinabove, the composite inflatable dunnage bag 240 of FIG. 9 comprises a first embodiment of a new and improved composite inflatable dunnage bag constructed in accordance with the principles and teachings of the present invention and has been entitled a 200 SERIES type dunnage bag. Accordingly, the reference characters of the component parts of the dunnage bag 240 which are similar to those corresponding component parts of the dunnage bag 40 of FIGS. 4–6 have similar reference characters except that they are within the 200 series of numbers.

More particularly, the dunnage bag 240 comprises a first inner composite bag 230, and a second outer composite bag 235 within which the first inner composite bag 230 is encased or enveloped, however, as will be discussed more fully hereinafter, the structures of the inner and outer composite bags 230 and 235, and therefore the structure of the entire composite inflatable dunnage bag 240 is substantially different from that of the dunnage bag 40 of FIGS. 4–6. As shown in FIG. 9, the first inner composite bag 230 is also seen to comprise an inflatable bladder 210 which is similar to the bladder 10 of the inner bag 30 and may therefore be fabricated from a similar suitable thermoplastic material, such as, for example, polyethylene.

As was the case with the bladder 10 of inner bag 30, bladder 210 comprises a flattened tubular member wherein each end thereof is heat sealed so as to close the bladder member and render the same airtight and capable of being inflated. The heat sealed end of the one end portion of the bladder 210 illustrated in FIG. 9 is denoted by reference character 212. The inflation valve member operatively associated with the inflatable bladder 210, and by means of which the same is inflated with a suitable compressed gas, such as, for example, air, has been omitted from the drawings simply for clarity purposes. In accordance with this first embodiment of the present invention, a single paper ply 221 is disposed upon both opposite surfaces or sides of the bladder 210, and each longitudinal end portion of the first inner composite bag 230, comprising the inflatable bladder 210 and the two paper plies 221, is folded over upon itself so as to form a double fold end closure 226. The end closure 226 is then secured in its folded state by means of, for example, a suitable adhesive or bonding tape 228.

Figure 1:
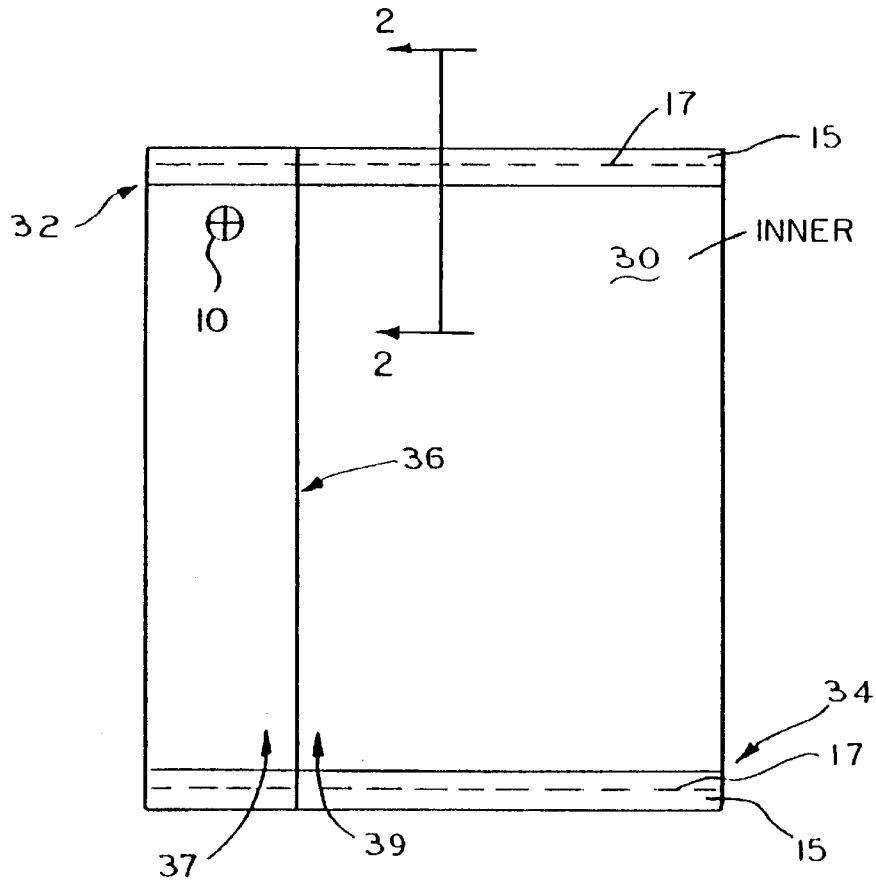
FIG. 1 is a plan view of the first inner composite bag of the invention set forth within the aforenoted related patent application.
Figure 2:
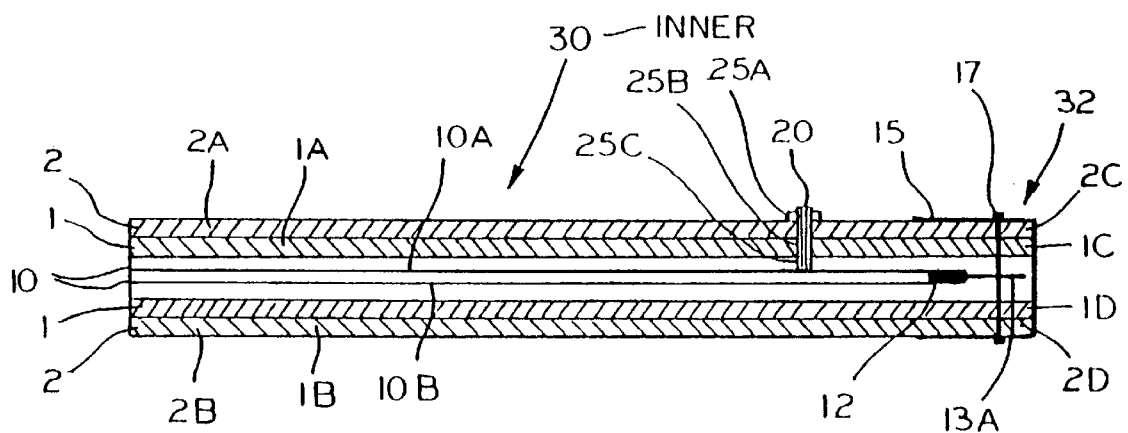
FIG. 2 is a cross-sectional view of the first inner composite bag shown in FIG. 1 as taken along the lines 2—2 of FIG. 1.
Figure 3:
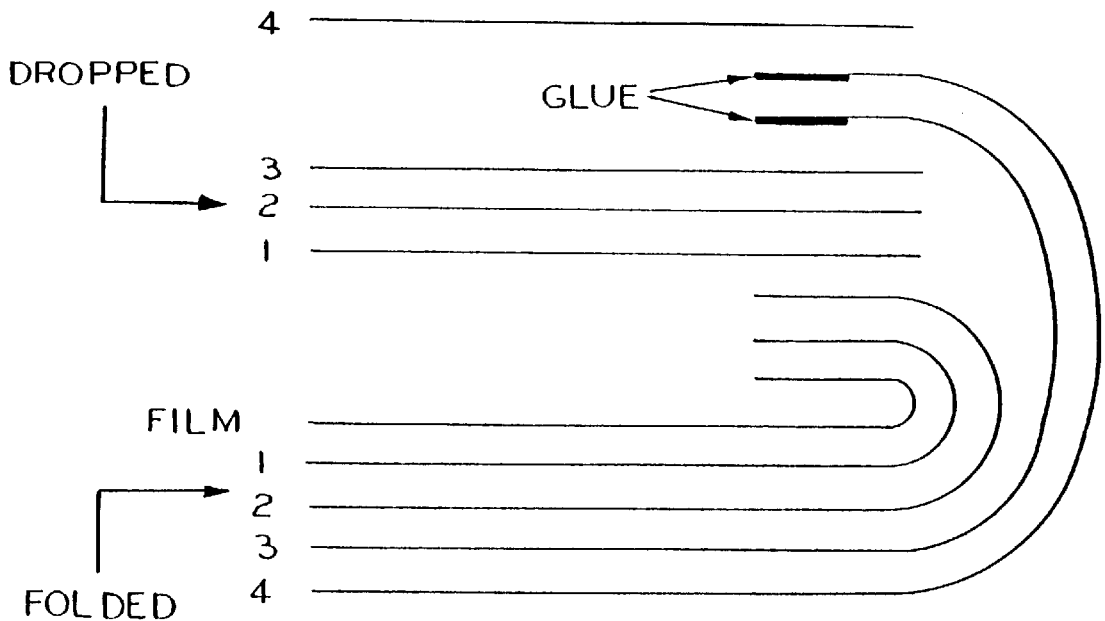
FIG. 3 is a schematic, partial cross-sectional view of a four-ply PRIOR ART dunnage bag.

It is to be noted that while a double fold end closure is shown in this embodiment of the first inner composite bag 230, the end closure may alternatively comprise a single fold end closure. Still further, and alternatively, in lieu of the structure noted herein in connection with the first inner composite bag 230 comprising the folded end closure 226, the first inner composite bag 230 may have structure similar to that of the first inner composite bag 30 shown in FIG. 2 although in lieu of the double or dual paper plies 1 and 2, a single paper ply would be employed in accordance with the principles and teachings of the embodiment of FIG. 9 of the present invention.

With reference still being made to FIG. 9, the structure of the second outer composite bag 235, and the relative disposition of its component parts with respect to the first inner composite bag 230, will become apparent. More particularly, as is the case with the first inner composite bag 230, the second outer composite bag 235 is also formed from or comprises a single paper ply 242 which is folded with respect to itself such that each one of the folded sections is disposed upon an opposite side of the first inner composite bag 230 whereby the first inner composite bag 230 is interposed between the two sections of the single paper ply 242. Each section of the single paper ply 242 has a respective end portion 2A and 2B, and it is seen that the end portion 2A overlaps end portion 2B and is secured thereto by means of a suitable glue bead 280.

Figure 4:
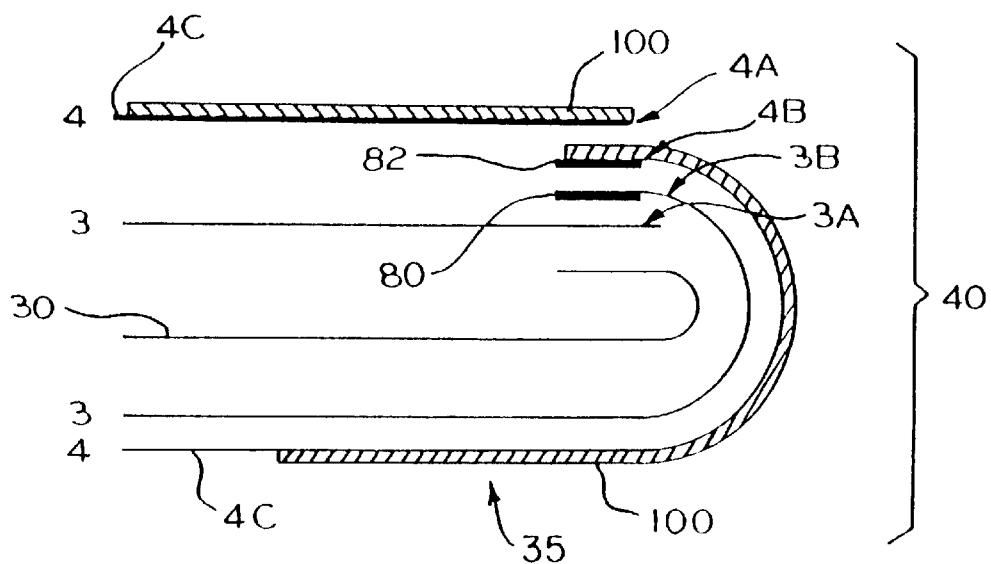
FIG. 4 is a view similar to that of FIG. 3 showing, however, a four-ply composite dunnage bag having the first inner composite bag of FIG. 1 incorporated therein.

With comparison therefore being made between the new and improved composite inflatable dunnage bag 240 and the composite inflatable dunnage bag 40 of, for example, FIG. 4, it is seen that the number of paper plies comprising the entire composite inflatable dunnage bag 240 only comprises two paper plies, that is, inner composite bag paper ply 221 and outer composite paper ply 242, whereas the number of paper plies comprising the composite inflatable dunnage bag 40 of FIG. 4 comprises four paper plies, that is, inner composite bag paper plies 1 and 2 and outer composite paper plies 3 and 4. Therefore, the number of paper plies comprising the entire composite inflatable dunnage bag 240 has, in effect, been reduced by fifty percent (50%), while the burst strength values or characteristics of the composite inflatable dunnage bag 240, which is approximately 9 psi, is nevertheless quite adequate and acceptable for predetermined load applications.

Figure 10:
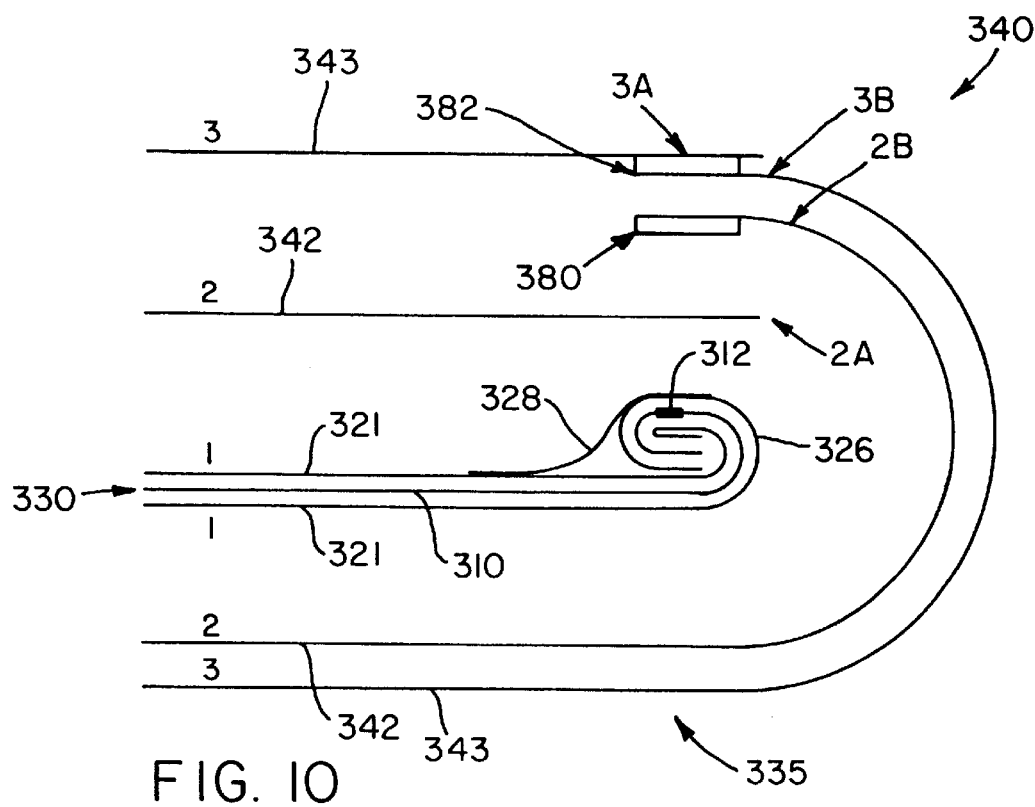
FIG. 10 is a view similar to that of FIGS. 4 and 9 showing, however, a second embodiment of a new and improved three-ply composite dunnage bag constructed in accordance with the principles and teachings of the present invention.

With reference now being made to FIG. 10, a second embodiment of the new and improved composite inflatable dunnage bag, constructed in accordance with the principles and teachings of the present invention, is illustrated and generally indicated by the reference character 340. The composite inflatable dunnage bag 340 is broadly similar to the composite inflatable bag 240 of FIG. 9, however, the composite inflatable dunnage bag 340 of FIG. 10 comprises a second embodiment of a new and improved composite inflatable dunnage bag constructed in accordance with the principles and teachings of the present invention and has been entitled a 300 SERIES type dunnage bag. Accordingly, the reference characters designating the component parts of the dunnage bag 340 which are similar to those corresponding component parts of the dunnage bag 240 of FIG. 9 have similar reference characters except that they are within the 300 series of numbers.

More particularly, the dunnage bag 340 comprises a first inner composite bag 330, and a second outer composite bag 335 within which the first inner composite bag 330 is encased or enveloped. The first inner composite bag 330 is seen to comprise an inflatable bladder 310 which is similar to the bladder 210 of the inner bag 230 and may therefore be fabricated from a similar suitable thermoplastic material, such as, for example, polyethylene. As was the case with bladder 210, bladder 310 has each end thereof sealed as shown at 312 which illustrates one end thereof, and a single paper ply 321 is disposed upon both opposite surfaces or sides of the bladder 310. Each longitudinal end portion of the first inner composite bag 330, comprising the inflatable bladder 310 and, in effect, the two paper plies 321, is folded over upon itself so as to form a double fold end closure 326. The end closure 326 is then secured in its folded state by means of, for example, a suitable adhesive or bonding tape 328. It is thus appreciated that the first inner composite bag 330 of the dunnage bag 340 is substantially identical to the first inner composite bag 230 of the dunnage bag 240.

However, in accordance with the principles and teachings of the present invention as embodied within the second embodiment dunnage bag 340, the structure of the second outer composite bag 335 is different from the structure of the second outer composite bag 235 of the dunnage bag 240. In particular, in lieu of the single paper ply 242 of the second outer composite bag 235 as illustrated in FIG. 9, the second outer composite bag 335 of the dunnage 340 of the embodiment disclosed within FIG. 10 comprises a pair of paper plies 342 and 343 which are folded over upon themselves such that each one of the folded sections is disposed upon an opposite side of the first inner composite bag 330 whereby the first inner composite bag 330 is interposed between the two sections of the pair of paper plies 342 and 343. Each section of paper ply 342 is respectively provided with an end portion 2A and 2B, and each section of paper ply 343 is similarly respectively provided with an end portion 3A and 3B. A first glue bead 380 is provided upon an inner surface region of end portion 2B of paper ply 342 such that end portion 2B of paper ply 342 is able to be secured to an outer surface region of end portion 2A of paper ply 342, and a second glue bead 382 is provided upon an inner surface region of end portion 3A of paper ply 343 such that end portion 3A of paper ply 343 is able to be secured to an outer surface region of end portion 3B of paper ply 343.

With comparison therefore being similarly made between the new and improved composite inflatable dunnage bag 340 and the composite inflatable dunnage bag 40 of, for example, FIG. 4, it is seen that the number of paper plies comprising the entire composite inflatable dunnage bag 340 comprises only three paper plies, that is, the single paper ply 321 of the first inner composite bag 330 and the two paper plies 342 and 343 of the second outer composite bag 335, while the number of paper plies comprising the composite inflatable dunnage bag 40 of FIG. 4 comprises four paper plies, that is, paper plies 1 and 2 of the inner composite bag 30 and paper plies 3 and 4 of the outer composite bag 35. Thus, again, the number of paper plies comprising the entire composite inflatable dunnage bag 340 has, in effect, been reduced, in this case, by twenty-five percent (25%), while the burst strength values or characteristics of the composite inflatable dunnage bag 340, which is approximately 12 psi, is nevertheless quite adequate and acceptable for predetermined load applications.

Figure 11:
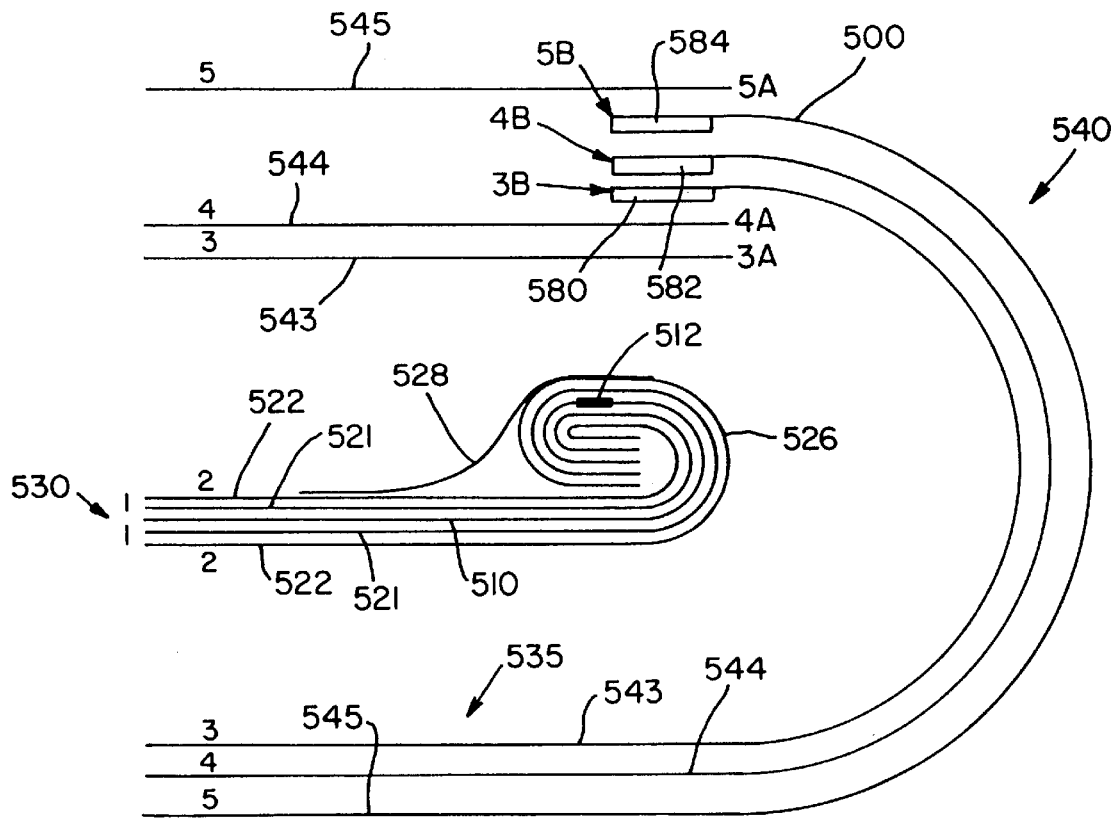
FIG. 11 is a view similar to that of FIG. 5 showing, however, a third embodiment of a new and improved fiveply composite dunnage bag constructed in accordance with the principles and teachings of the present invention.

With reference continuing to be made to the drawings, and with particular reference now being made to FIG. 11, a third embodiment of the new and improved composite inflatable dunnage bag, constructed in accordance with the principles and teachings of the present invention, is illustrated and generally indicated by the reference character 540. The composite inflatable dunnage bag 540 is broadly similar to the composite inflatable dunnage bag 340 of FIG. 10, however, the composite inflatable dunnage bag 540 of FIG. 11 comprises a third embodiment of a new and improved composite inflatable dunnage bag constructed in accordance with the principles and teachings of the present invention and has been entitled a 500 SERIES type dunnage bag. Accordingly, the reference characters designating the component parts of the dunnage bag 540 which are similar to those corresponding component parts of the dunnage bag 340 of FIG. 10 have similar reference characters except that they are within the 500 series of numbers.

More particularly, the dunnage bag 540 comprises a first inner composite bag 530, and a second outer composite bag 535 within which the first inner composite bag 530 is encased or enveloped. The first inner composite bag 530 is seen to comprise an inflatable bladder 510 which is similar to the bladder 310 of the first inner composite bag 330 and may thus be fabricated from a similar suitable thermoplastic material, such as, for example, polyethylene. As was the case with bladder 310, bladder 510 has each end thereof sealed as shown at 512 which illustrates one end thereof, however, in lieu of the single paper ply 321 of the first inner composite bag 330, the first inner composite bag 530 comprises a pair of paper plies 521 and 522 disposed upon both opposite surfaces or sides of the bladder 510. Each longitudinal end portion of the first inner composite bag 530, comprising the inflatable bladder 510 and, in effect, the four paper plies 521,521,522,522, is folded over upon itself so as to form a double fold end closure 526. The end closure 526 is then secured in its folded state by means of, for example, a suitable adhesive or bonding tape 528.

It is thus appreciated that the first inner composite bag 530 of the dunnage bag 540 is different than the first inner composite bag 330 of the dunnage bag 340, and similarly for the structure of the second outer composite bag 535 of the dunnage bag 540 as compared to the second outer composite bag 335 of the dunnage bag 340. More particularly, in lieu of the two paper plies 342 and 343 of the second outer composite bag 335 as illustrated in FIG. 10, the second outer composite bag 535 of the dunnage bag 540 of the embodiment disclosed in FIG. 11 comprises three paper plies 543,544,545 which are folded over upon themselves such that each one of the folded sections is disposed upon an opposite side of the first inner composite bag 530 whereby the first inner composite bag 530 is interposed between the two sections of the three paper plies 543,544,545. Each section of paper ply 543 is respectively provided with an end portion 3A and 3B, each section of paper ply 544 is respectively provided with an end portion 4A and 4B, and each section of paper ply 545 is respectively provided with an end portion 5A and 5B. A first glue bead 580 is provided upon an inner surface region of end portion 3B of paper ply 543 such that end portion 3B of paper ply 543 can be secured to an outer surface region of end portion 4A of paper ply 544, and a second glue bead 582 is provided upon an inner surface region of end portion 4B of paper ply 544 such that end portion 4B of paper ply 544 can be secured to an outer surface region of end portion 3B of paper ply 543. A third glue bead 584 is provided upon an inner surface region of end portion 5B of paper ply 545 such that end portion 5B of paper ply 545 can be secured to an outer surface region of end portion 4B of paper ply 544. In addition, as was the case with the dunnage bag 40 of FIG. 4, the outer surface of paper ply 545 is provided with a suitable heat-sealable plastic coating 500, such as, for example, polyethylene, whereby through means of known heat-sealing techniques, end portion 5A of paper ply 545 can be secured to end portion 5B of paper ply 545.

Figure 5:
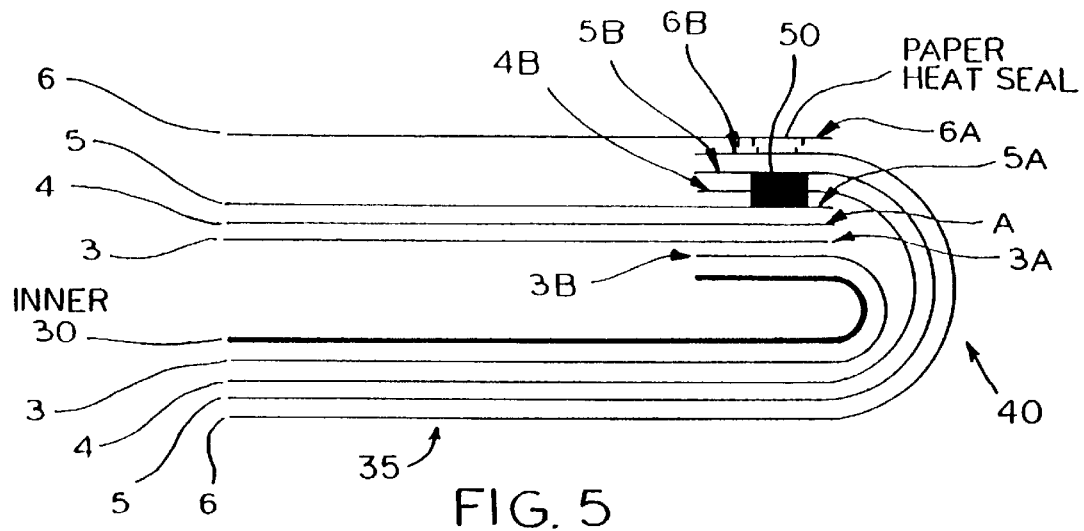
FIG. 5 is a view similar to that of FIG. 4 showing, however, a six-ply composite dunnage bag having the first inner composite bag of FIG. 1 incorporated therein.

With comparison therefore being made between the new and improved composite inflatable dunnage bag 540 and the composite inflatable dunnage bag 40 of, for example, FIG. 5, it is seen that the number of paper plies comprising the entire composite inflatable dunnage bag 540 comprises only five paper plies, that is, the two paper plies 521,522 of the first inner composite bag 530 and the three paper plies 543,544,545 of the second outer composite bag 535, while the number of paper plies comprising the composite inflatable dunnage bag 40 of FIG. 5 comprises six paper plies, that is, paper plies 1 and 2 of the inner composite bag 30 and paper plies 3–6 of the outer composite bag 35. Thus, again, the number of paper plies comprising the entire composite inflatable dunnage bag 540 has in effect been reduced, in this case, by approximately sixteen percent (16%), while the burst strength characteristics or values of the composite inflatable dunnage bag 540, which is approximately 24 psi, is nevertheless quite adequate and acceptable for predetermined load applications.

Figure 12:
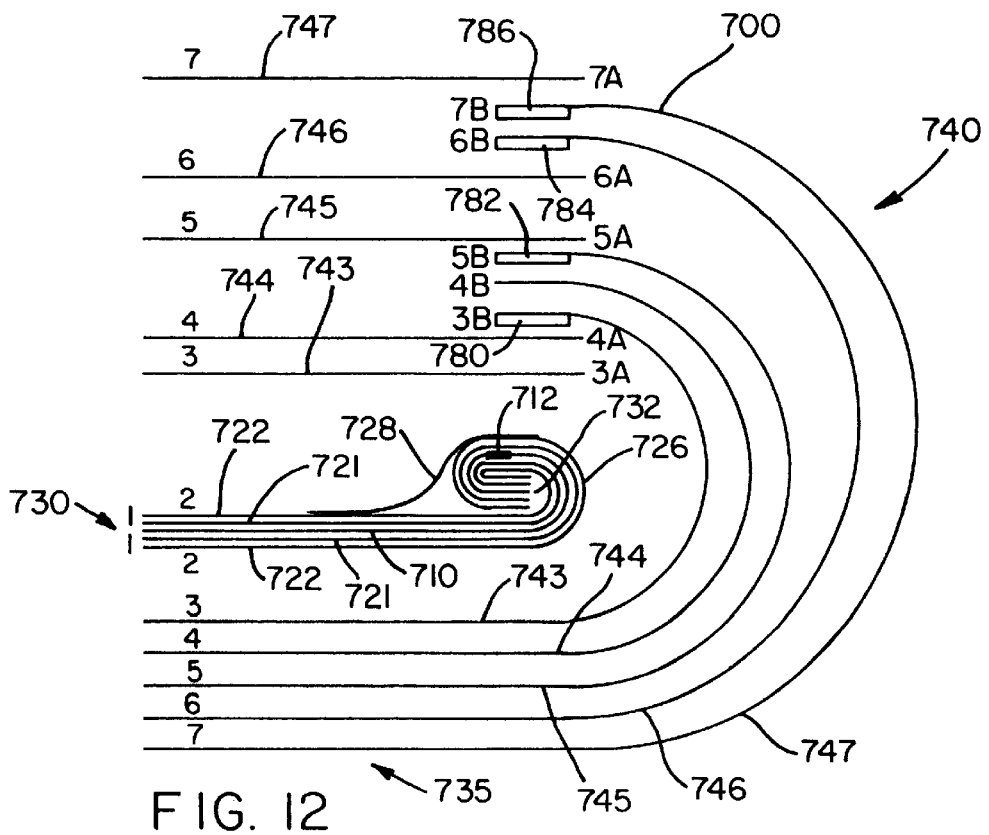
FIG. 12 is a view similar to that of FIG. 6 showing, however, a fourth embodiment of a new and improved sevenply composite dunnage bag constructed in accordance with the principles and teachings of the present invention.

With reference lastly being made to FIG. 12 of the drawings, a fourth embodiment of the new and improved composite inflatable dunnage bag, constructed in accordance with the principles and teachings of the present invention, is illustrated and generally indicated by the reference character 740. The composite inflatable dunnage bag 740 is broadly similar to the composite inflatable dunnage bag 540 of FIG. 11, however, the composite inflatable dunnage bag 740 of FIG. 12 comprises a fourth embodiment of a new and improved composite inflatable dunnage bag constructed in accordance with the principles and teachings of the present invention and has been entitled a 700 SERIES type dunnage bag. Accordingly, the reference characters designating the component parts of the dunnage bag 740 which are similar to those corresponding component parts of the dunnage bag 540 of FIG. 11 have similar reference characters except that they are within the 700 series of numbers.

More particularly, the dunnage bag 740 comprises a first inner composite bag 730, and a second outer composite bag 735 within which the first inner composite bag 730 is encased or enveloped. The first inner composite bag 730 is seen to comprise an inflatable bladder 710 which is similar to the bladder 510 of the first inner composite bag 530 and may thus be fabricated from a similar suitable thermoplastic material, such as, for example, polyethylene. As was the case with bladder 510 of the first inner composite bag 530, bladder 710 has each end thereof sealed as shown at 712 which illustrates one end thereof, and the first inner composite bag 730 comprises a pair of paper plies 721 and 722 disposed upon both opposite surfaces or sides of the bladder 710. Each longitudinal end portion of the first inner composite bag 730, comprising the inflatable bladder 710 and, in effect, the four paper plies 721,721,722,722, is folded over upon itself so as to form a double fold end closure 726. The end closure 726 is then secured in its folded state by means of, for example, a suitable adhesive or bonding tape 728. It is also noted that in connection with the double fold end enclosure 726, as well as the double fold end closures 526, 326, and 226, as well as the end closure disclosed in connection with the sewn or stitched inner bag of FIG. 2, the ends or free edge portions of all of the paper plies comprising the first inner composite bag are all disposed within a common plane as shown, for example, at 732.

It is thus appreciated that the first inner composite bag 730 of the dunnage bag 740 is substantially identical to the first inner composite bag 530 of the dunnage bag 540, however, the structure of the second outer composite bag 735 of the dunnage bag 740 is different from that of the second outer composite bag 535 of the dunnage bag 540. More particularly, in lieu of the three paper plies 543,544,545 of the second outer composite bag 535 of the dunnage bag 540 as illustrated in FIG. 11, the second outer composite bag 735 of the dunnage bag 740 illustrated in FIG. 12 comprises five paper plies 743,744,745,746,747 which are folded over upon themselves such that each one of the folded sections is disposed upon an opposite side of the first inner composite bag 730 whereby the first inner composite bag 730 is interposed between the two sections of the five paper plies 743,744,745, 746,747. Each section of paper ply 743 is respectively provided with an end portion 3A and 3B, each section of paper ply 744 is respectively provided with an end portion 4A and 4B, each section of paper ply 745 is respectively provided with an end portion 5A and 5B, each section of paper ply 746 is respectively provided with an end portion 6A and 6B, and each section of paper ply 747 is respectively provided with an end portion 7A and 7B.

In order to seal and secure the various paper plies of the second outer composite bag 735, and to complete the assembly of the entire composite inflatable dunnage bag 740, and as was the case with the dunnage bag 540, end portions 3A and 4A of paper plies 743 and 744 of the second outer composite bag 735 are disposed or inserted beneath the end portion 3B of the paper ply 743, and a first glue bead 780 is provided upon an inner surface region of end portion 3B such that end portion 3B of paper ply 743 can be secured to an outer surface region of end portion 4A of paper ply 744. End portions 4B and 5B of paper plies 744 and 745 are interposed between end portions 3B and 5A of paper plies 743 and 745, and a second glue bead 782 is provided upon an inner surface region of end portion 5B such that end portion 5B of paper ply 745 is secured to an outer surface portion of end portion 4B paper ply 744. End portions 5A and 6A of paper plies 745 and 746 are inserted or interposed between end portions 5B and 6B of paper plies 745 and 746, respectively, and a third glue bead 784 is provided upon an inner surface region of end portion 6B of paper ply 746 such that end portion 6B of paper ply 746 can be secured to an outer surface region of end portion 6A of paper ply 746. End portions 6B and 7B of paper plies 746 and 747, respectively, are interposed between end portion 6A of paper ply 746 and end portion 7A of paper ply 747, and a fourth glue bead 786 is provided upon an inner surface region of end portion 7B of paper ply 747 such that end portion 7B can be secured to an outer surface region of end portion 6B of paper ply 746. As was the case with the dunnage bag 540 of FIG. 11, the outer surface of paper ply 747 is provided with a suitable heat-sensitive plastic coating 700, such as, for example, polyethylene, whereby through means of known suitable heat-sealing techniques, an interior surface region of end portion 7A of paper ply 747 can be secured to an outer surface region of end portion 7B of paper ply 747.

Figure 6:
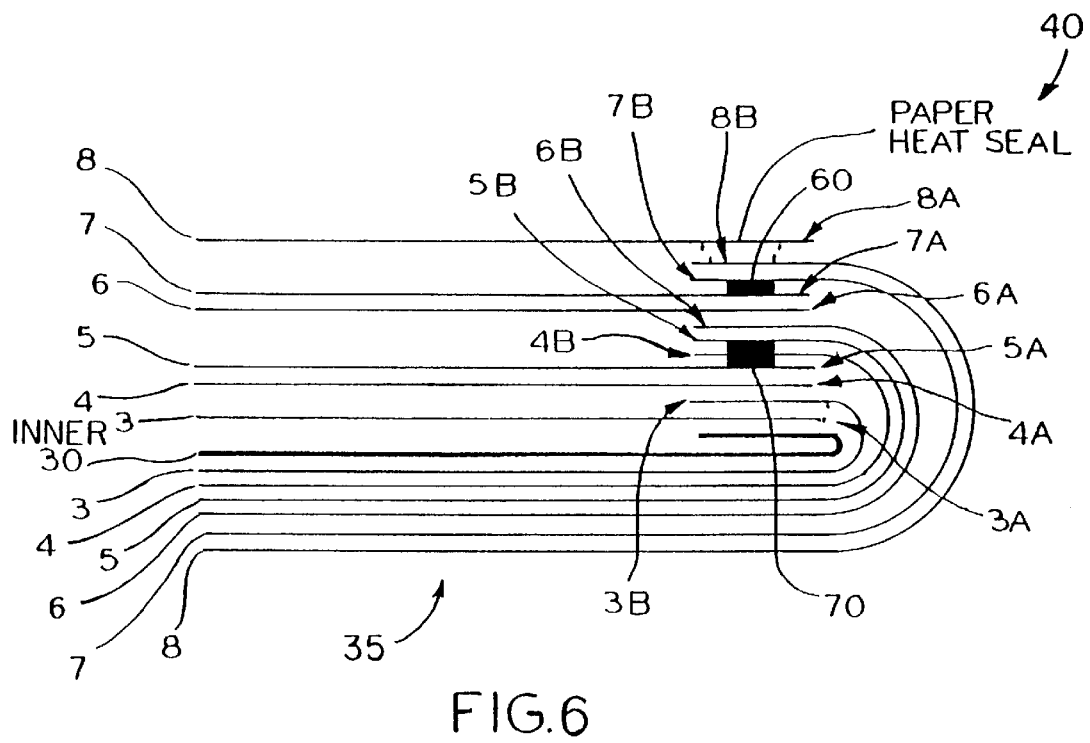
FIG. 6 is a view similar to that of FIGS. 4 and 5 showing, however, an eight-ply composite dunnage bag having the first inner composite bag of FIG. 1 incorporated therein.
Figure 7:
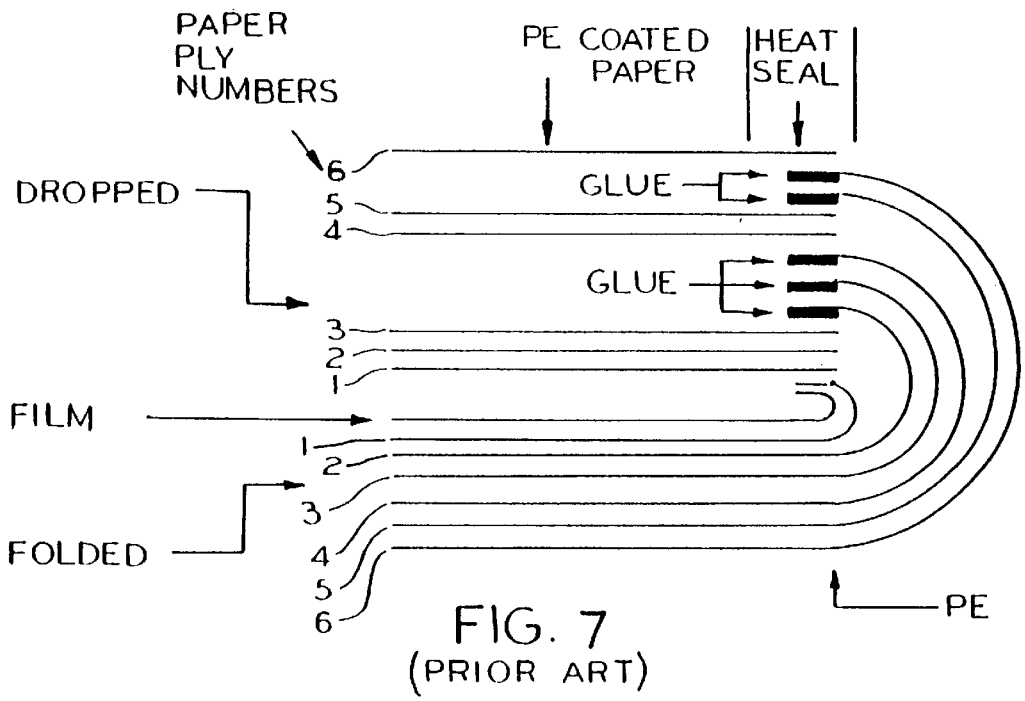
FIG. 7 is a view similar to that of FIG. 3 showing, however, a six-ply PRIOR ART dunnage bag.
Figure 8:
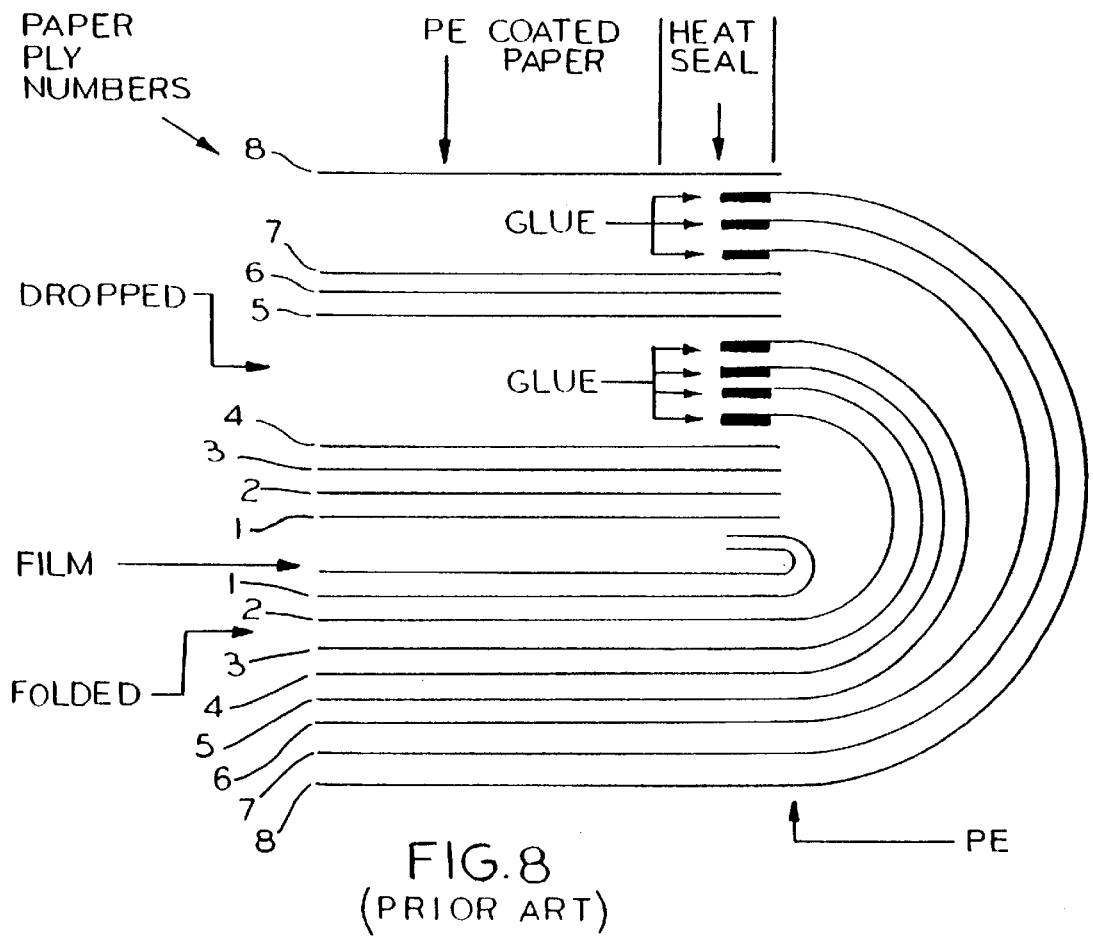
FIG. 8 is a view similar to that of FIGS. 3 and 7 showing, however, an eight-ply PRIOR ART dunnage bag.

With comparison therefore being made between the new and improved composite inflatable dunnage bag 740 and the composite inflatable dunnage bag 40 of, for example, FIG. 6, it is seen that the number of paper plies comprising the entire composite inflatable dunnage bag 740 comprises only seven paper plies, that is, the two paper plies 721,722 of the first inner composite bag 730, and the five paper plies 743,744,745, 746,747 of the second outer composite bag 735, while the number of paper plies comprising the composite inflatable dunnage bag 40 of FIG. 6 comprises eight paper plies, that is, plies 1 and 2 of the inner composite bag 30, and paper plies 3–8 of the outer composite bag 35. Thus, again, the number of paper plies comprising the entire composite inflatable dunnage bag 740 has in effect been reduced, in this case, by approximately twelve and one-half percent (12.5%), while the burst strength characteristics or values of the composite inflatable dunnage bag 740, which is approximately 30 psi, is nevertheless quite adequate and acceptable for predetermined load applications.

Thus it may be appreciated that in accordance with the various teachings, disclosures, and principles of the present invention, a new and improved inflatable dunnage bag has been developed whereby not only does such dunnage bag exhibit requisite or desired predetermined burst strength or pressure values, as well as structural integrity against failure by bonding and securing the various paper plies of the composite dunnage bag by means of suitable adhesive patterns or arrangements, but in addition, and additionally important and desirable from a manufacturing point of view, the structure of the dunnage bag is simplified whereby the number of paper plies required for a particular dunnage bag and a particular load application can be reduced. Accordingly, in view of the saving of the number of paper plies required to manufacture a single dunnage bag, or considered alternatively, in view of the cost per paper ply unit or sheet, a substantial savings in manufacturing costs is able to be achieved. It is thus to be appreciated that the dunnage bag constructed in accordance with the principles and teachings of the present inventive disclosure constitutes an advancement in the dunnage bag art.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United State of America is:

1. An inflatable dunnage bag, comprising:
   a sealed inflatable bladder having a first wall, a second wall, and an interior space defined between said first and second walls for containing a gas for inflating said inflatable bladder;
   a sealed inner bag defining a first interior space therein within which said inflatable bladder is disposed, said sealed inner bag having a predetermined length defined between opposite first and second ends thereof and comprising only a single paper ply disposed upon an exterior surface of each one of said first and second walls of said inflatable bladder, said paper plies have substantially the same lengths extending from said first end of said sealed inner bag to said second end of said sealed inner bag such that end portions of said paper plies have end edges disposed within a common plane which is disposed transverse to said lengths of said paper plies, and wherein further, said sealed inner bag, comprising said paper plies and said inflatable bladder interposed between said paper plies, comprises an independent sealed entity;
   a sealed outer bag comprising at least two sealed paper plies and defining a second interior space therein within which said independent sealed inner bag entity is disposed; and
   means for inflating said inflatable bladder of said sealed inner bag with a gas, said means being sealingly secured to said inflatable bladder and in fluidic communication with said interior space of said inflatable bladder.

2. The dunnage bag as set forth in claim 1, wherein:
   said at least two paper plies of said sealed outer bag respectively comprise oppositely disposed end portions with one of said oppositely disposed end portions of a respective one of said at least two paper plies overlapping the other one of said oppositely disposed end portions of said respective one of said at least two paper plies; and
   glue bead means, for sealing said oppositely disposed end portions together, is interposed between said overlapped end portions so as to seal said oppositely disposed overlapped end portions together.

3. The dunnage bag as set forth in claim 2, wherein:
   first end portions of each one of said at least two paper plies are interposed between second end portions of said at least two paper plies.

4. The dunnage bag as set forth in claim 1, wherein:
   each one of said opposite first and second ends of said sealed inner bag, comprising said inflatable bladder and said single paper ply disposed upon opposite exterior surfaces of said inflatable bladder, is folded over upon itself so as to comprise a double-folded end of said sealed inner bag.

5. The dunnage bag as set forth in claim 4, further comprising:
   tape means, secured to each one of said double-folded ends of said sealed inner bag and to an exterior surface portion of one of said paper plies of said sealed inner bag disposed upon one of said exterior surfaces of said inflatable bladder, for maintaining said double-folded ends of said sealed inner bag in their folded states.

6. The dunnage bag as set forth in claim 1, wherein:
   each one of said opposite first and second ends of said sealed inner bag, comprising said inflatable bladder and said single paper ply disposed upon opposite exterior surfaces of said inflatable bladder, comprises stitching means for securing said inflatable bladder and said paper plies together.

7. An inflatable dunnage bag, comprising:
   a sealed inflatable bladder having a first wall, a second wall, and an interior space defined between said first and second walls for containing a gas for inflating said inflatable bladder;

a sealed inner bag defining a first interior space therein within which said inflatable bladder is disposed, said sealed inner bag having a predetermined length defined between opposite first and second ends thereof and comprising a pair of paper plies respectively disposed upon an exterior surface of each one of said first and second walls of said inflatable bladder, said paper plies have substantially the same lengths extending from said first end of said sealed inner bag to said second end of said sealed inner bag such that end portions of said paper plies have end edges disposed within a common plane which is disposed transverse to said lengths of said paper plies, and wherein further, said sealed inner bag, comprising said paper plies and said inflatable bladder interposed between said paper plies, comprises an independent sealed entity;

a sealed outer bag comprising an odd number of sealed paper plies and defining a second interior space therein within which said independent sealed inner bag entity is disposed; and means for inflating said inflatable bladder of said sealed inner bag with a gas, said means being sealingly secured to said inflatable bladder and in fluidic communication with said interior space of said inflatable bladder.

8. The dunnage bag as set forth in claim 7, wherein:

said odd number of paper plies of said sealed outer bag respectively comprise oppositely disposed end portions with one of said oppositely disposed end portions of a respective one of said at least two paper plies overlapping the other one of said oppositely disposed end portions of said respective one of said at least two paper plies; and glue bead means, for sealing said oppositely disposed end portions together, is interposed between predetermined ones of said overlapped end portions of said odd number of paper plies so as to seal said oppositely disposed overlapped end portions together.

9. The dunnage bag as set forth in claim 8, wherein:

first end portions of each one of said odd number of paper plies are interposed between second end portions of predetermined ones of said odd number of paper plies.

10. The dunnage bag as set forth in claim 9, wherein:

an exterior surface portion of one of said odd number of paper plies is provided with a heat-sealable material such that said exterior surface portion of said one of said odd number of paper plies can be heat-sealed to an interior surface portion of said one of said odd number of paper plies.

11. The dunnage bag as set forth in claim 7, wherein:

each one of said opposite first and second ends of said sealed inner bag, comprising said inflatable bladder and said pair of paper plies disposed upon opposite exterior surfaces of said inflatable bladder, is folded over upon itself so as to comprise a double-folded end of said sealed inner bag.

12. The dunnage bag as set forth in claim 11, further comprising:

tape means, secured to each one of said double-folded ends of said sealed inner bag and to an exterior surface portion of one of said paper plies of said sealed inner bag disposed upon one of said exterior surfaces of said inflatable bladder, for maintaining said double-folded ends of said sealed inner bag in their folded states.

13. The dunnage bag as set forth in claim 7, wherein:

each one of said opposite first and second ends of said sealed inner bag, comprising said inflatable bladder and said single paper ply disposed upon opposite exterior surfaces of said inflatable bladder, comprises stitching means for securing said inflatable bladder and said paper plies together.

14. The dunnage bag as set forth in claim 7, wherein:

said odd number of paper plies comprising said sealed outer bag is three.

15. The dunnage bag as set forth in claim 7, wherein:

said odd number of paper plies comprising said sealed outer bag is five.

* * * * *